July 9, 1963
K. B. AMER ETAL
3,096,826
ROTOR BLADE FOR ROTARY-WINGED AIRCRAFT
Filed Aug. 7, 1961
4 Sheets-Sheet 1
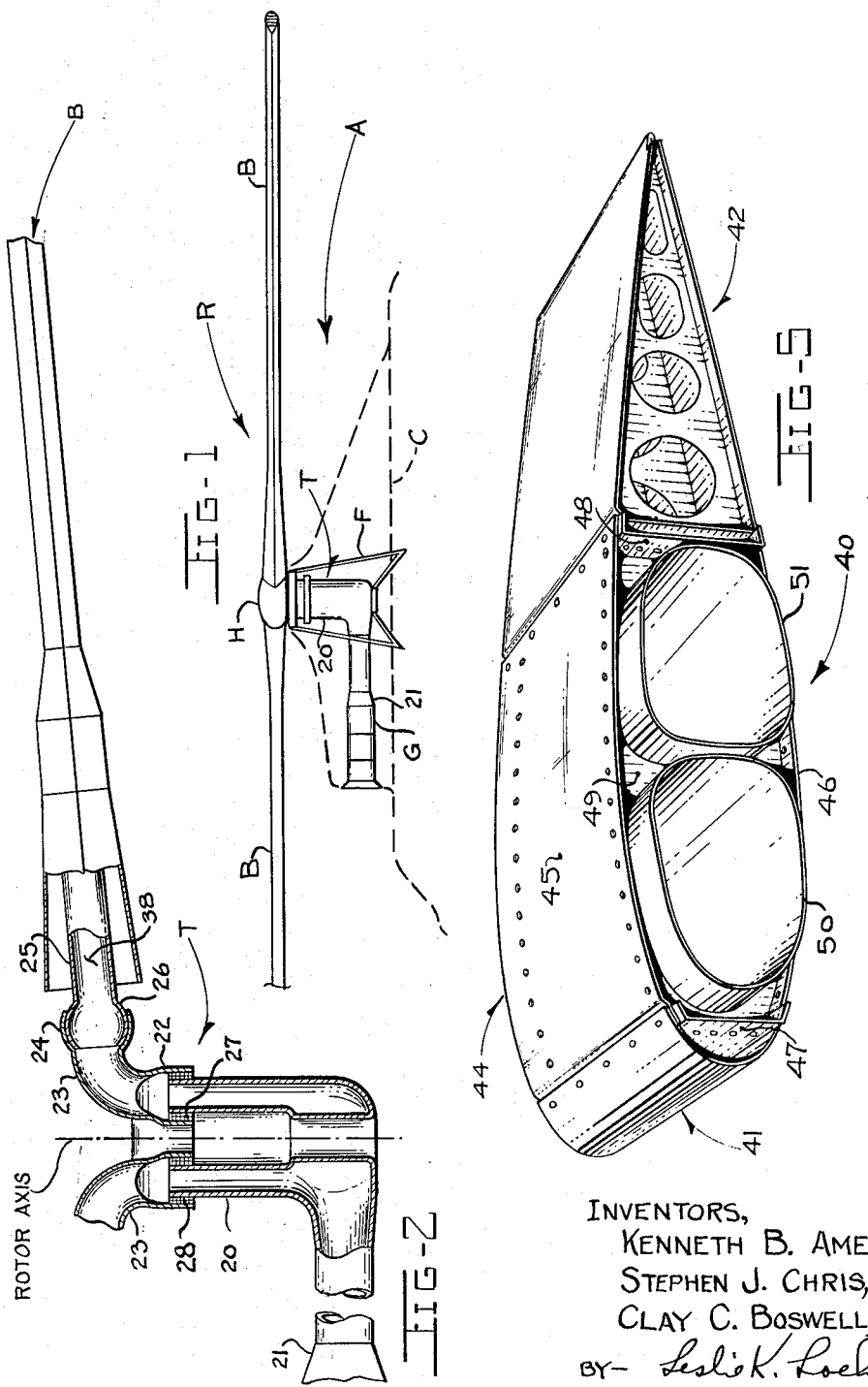
INVENTORS,
KENNETH B. AMER,
STEPHEN J. CHRIS, AND
CLAY C. BOSWELL, JR.
BY— Leslie K. Loehr
THEIR AGENT.

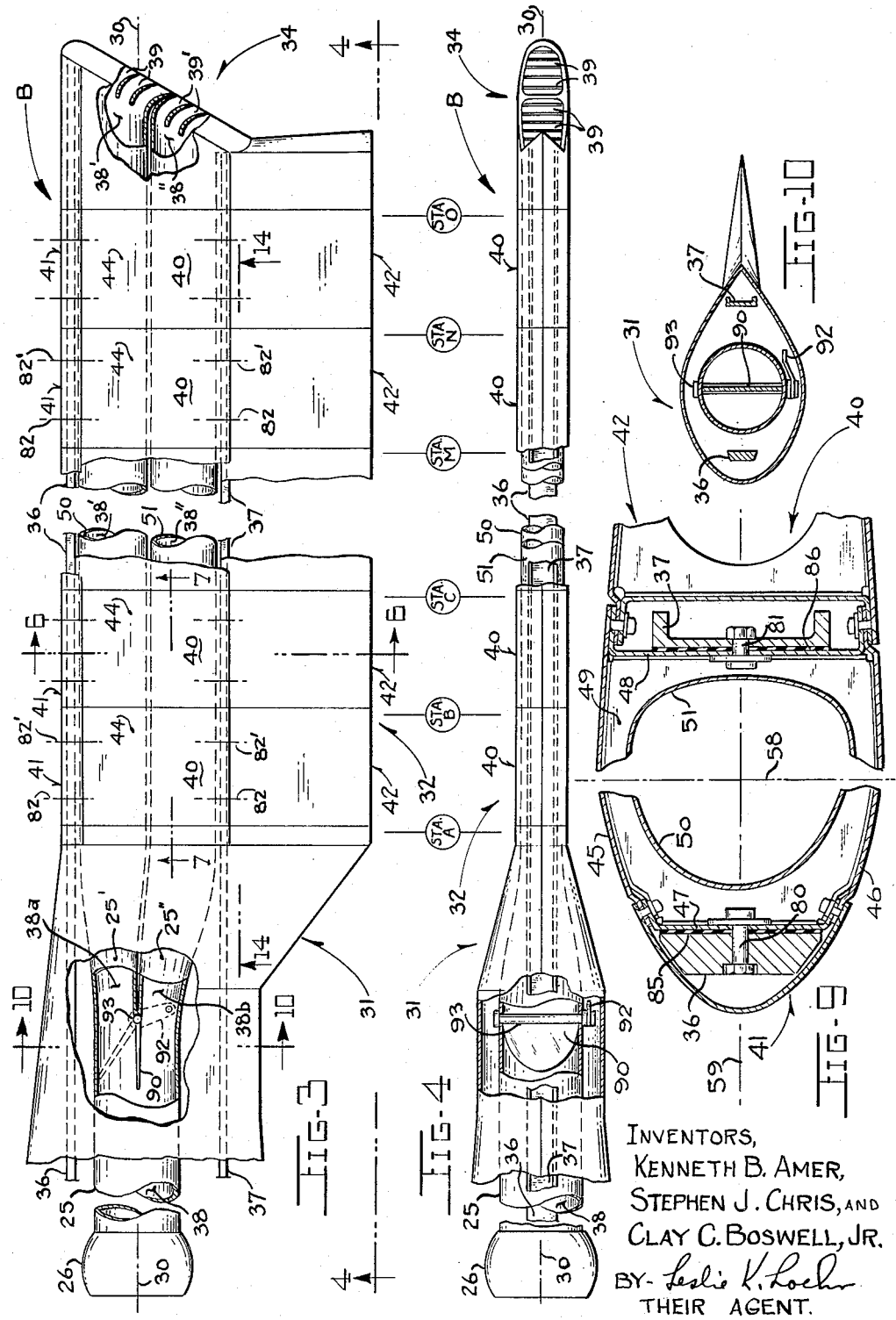

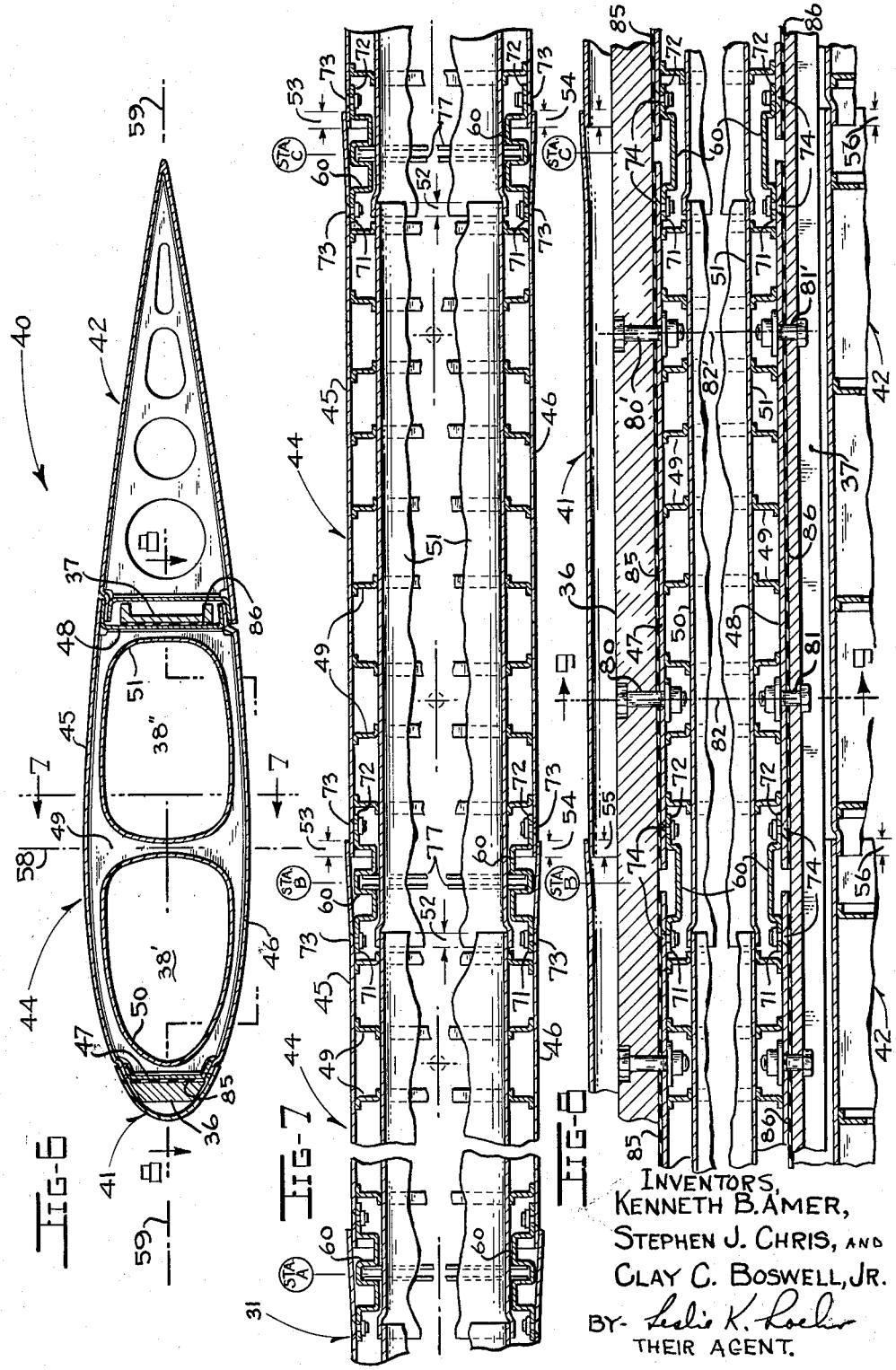

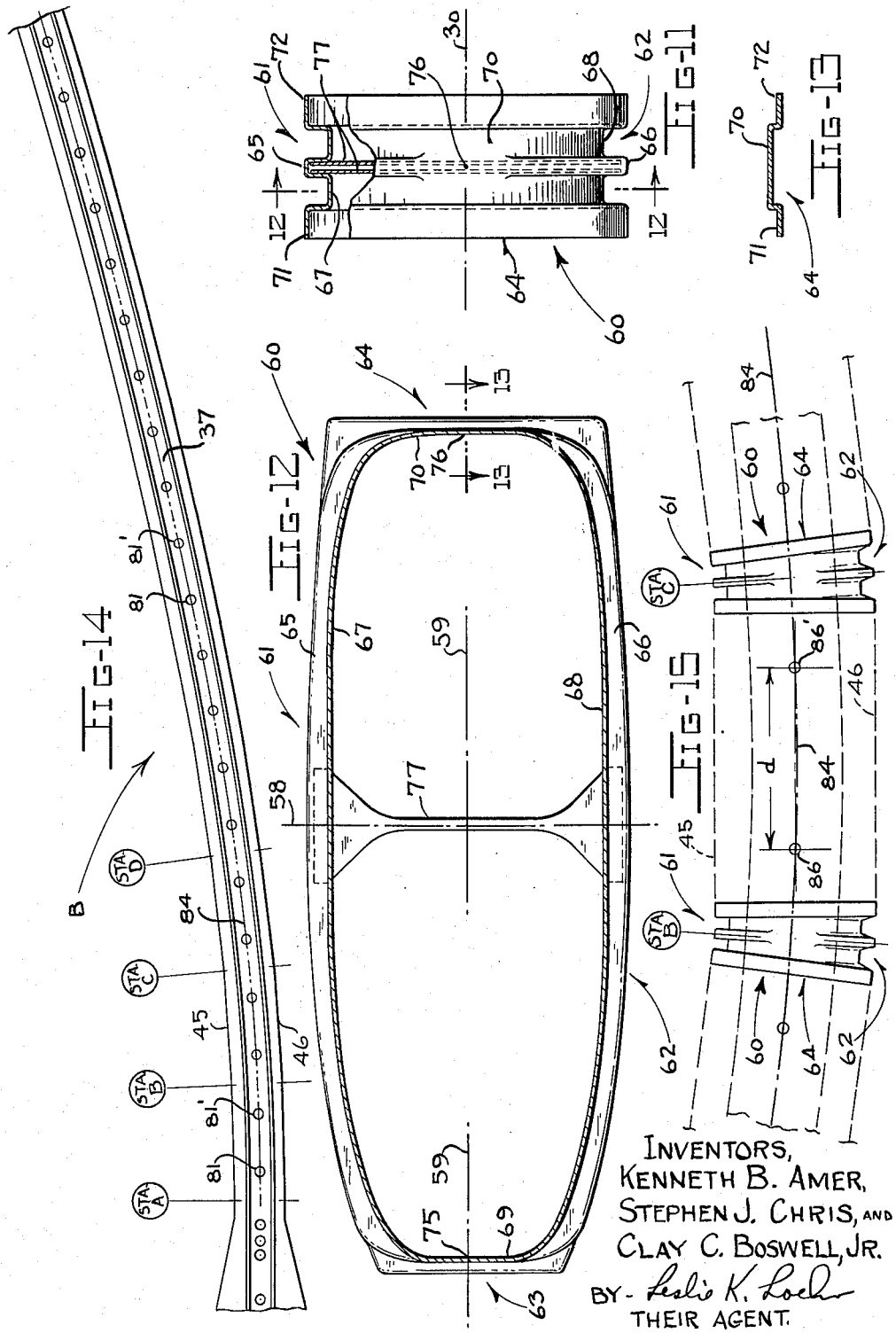

United States Patent Office 3,096,826
Patented July 9, 1963

3,096,826
ROTOR BLADE FOR ROTARY-WINGED
AIRCRAFT
Kenneth B. Amer and Stephen J. Chris, Los Angeles, and
Clay C. Boswell, Jr., Rolling Hills Estates, Calif., assignors to Hughes Tool Company, Aircraft Division,
Houston, Tex., a corporation of Delaware
Filed Aug. 7, 1961, Ser. No. 129,720
10 Claims. (Cl. 170—135.4)

This invention relates in general to aerodynamic thrust-producing rotors for rotary-winged aircraft and, in particular, to the blades employed on such rotors.

It is well known that rotary-winged aircraft such as helicopters, are sustained in the air by forces of upward thrust produced as a result of downward velocity continuously imparted to large masses of air by the blades of a revolving rotor, and that rotors of this character are commonly driven by suitable engines directly coupled to the rotor hub or by jet propulsion forces applied at the outer ends of the rotor blades. In constructing such rotor blades, it is accepted practice to provide a substantially rigid inboard portion for connecting each blade to a suitable hub, and a thrust-producing portion for imparting the downward velocity to the large masses of air. The thickness and the width or chordwise dimension of the thrust-producing portion is contoured throughout the length or span of this portion according to proven airfoil designs to provide each blade with optimum thrust-producing efficiency. Moreover, each such blade is constructed so as to be provided with sufficient strength to withstand centrifugal forces resulting from rotor rotation, and to be provided with adequate strength and stiffness to withstand aerodynamic and control forces which operate to twist the blade about its longitudinal axis and to bend the blade in both chordwise and flapwise directions, although the flapwise bending is counteracted to an appreciable degree by the centrifugal forces.

The present invention is concerned with blades of the above character which are particularly adapted for use in rotors of the jet-propelled type, and it contemplates rotor blades wherein pressurized gaseous fluid, especially hot gaseous fluid is conducted from a suitable generator of hot pressurized gas, through passageways in the blades and is expelled to atmosphere through suitable openings in the outer ends of the blades such that reaction forces are produced for driving the thrust-producing rotor of a helicopter or other rotary-winged aircraft.

Several problems involved in jet-driven rotors wherein pressurized hot gaseous fluid is conducted through passageways in the rotor blades, astem from the fact that the walls of the gas-conducting passageways are heated by the hot gases; thus considerable heat is lost to surrounding atmosphere unless the passageways are formed by separate ducts arranged such as to minimize heat-transfer to the outer skins. However, any solution to prevent heat-transfer, results in elevated operating temperatures for the separate ducts and a consequent impairment in the strength of the duct-forming material. Hence, to be successful, rotor blades employing separate ducts must be constructed such that the abilities of the blades to resist twisting and bending forces during rotor operation exist independently of the gas-conducting ducts.

Broadly the rotor blade structure of this invention comprises a plurality of airfoil-shaped segments supported in series by fore and aft spars separated by and pivotally connected along their neutral axes in a common chordwise plane to box-like sections of the segments, which sections are structurally interconnected by bellows-like elements of a character such as to provide the blade with torsional rigidity against forces acting to twist the blade about its longitudinal axis, and at the same time, provide the blade with adequate spanwise flexibility of a character such that flapwise bending of the blade can occur in a second plane coextensive with and substantially normal to the common chordwise plane without subjecting the upper and lower skins of the airfoil-shaped segments to the forces of tension and compression normally associated with the upper and lower skins of conventional thrust-producing rotor blades. Each box-like section includes gas-conducting liners or ducts attached to and supported by a plurality of ribs, which ribs are also attached to upper and lower skin portions and to fore and aft end plates constructed for the pivotal connections to the spars. The liners or ducts are supported in spaced relationship to the skin portions and end plates and are connected by slip-joint connections to liners of adjacent box-like sections such as to provide continuous and articulated gas-conducting conduits through the rotor blade, having ability to accommodate flapwise bending of the spars without bending the walls of the ducts. Moreover, because of the spaced relationship, the articulated conduits are well insulated from the skin portions and end plates to the extent that under conditions where hot gases are conducted through the conduits, excessive heat losses to surrounding atmosphere are effectively precluded.

Accordingly, it is a principle object of this invention to provide an efficient rotor blade suitable for use in a jet-driven thrust-producing rotor of a rotary-winged aircraft.

It is another object to provide such a rotor blade having a gas-conducting passageway extending longitudinally therethrough and terminating at the distal end of the blade in an opening suitable for producing jet reaction forces.

Another object of this invention is the provision of a jet-driven rotor blade having a smooth-walled hot-gas-conducting passageway constructed such that normal flapwise bending of the blade can occur without producing bending stresses in the walls of the passageway.

It is another object to provide a blade of this character wherein the walls of the passageway are capable of performing their intended function at elevated temperatures up to about 1200° F., and at the same time, provide such a blade in which the twist and bend resisting abilities of the composite blade are not affected as a result of the elevated operating temperatures of the walls of the passageway. It is also an object to provide such a blade in which the loss of heat to surrounding atmosphere during rotor operation is maintained at an acceptable minimum.

These and other objects and advantages will become more apparent from the following description considered in connection with the accompanying drawings; it being expressly understood, however, that the drawings are for the purpose of illustration and description only, and are not intended as a definition of the limits of the invention.

In the drawings:

FIG. 1 is an elevational view showing a jet-driven rotor employing rotor blades according to the present invention;

FIG. 2 is a sectional view schematically showing the gas-conducting connection between the gas generator and the root-ends of the blades seen in FIG. 1;

FIG. 3 is a fragmentary plan view of a preferred form of the rotor blade shown in FIG. 1;

FIG. 4 is a view taken as indicated by line 4—4 of FIG. 3;

FIG. 5 is a perspective of an airfoil-shaped segment of the blade;

FIG. 6 is a sectional view taken on line 6—6 of FIG. 3;

FIG. 7 is a fragmentary sectional view taken on lines 7—7 of FIGS. 3 and 6;

FIG. 8 is a fragmentary sectional view taken on line 8—8 of FIG. 6;

FIG. 9 is a fragmentary sectional view taken on line 9—9 of FIG. 8;

FIG. 10 is a sectional view taken on line 10—10 of FIG. 3;

FIG. 11 is an end view of a bellows-like segment connector;

FIG. 12 is a view taken on line 12—12 of FIG. 11;

FIG. 13 is a view taken on chord line 59 of FIG. 12 as indicated by numerals 13—13;

FIG. 14 is a view of the blade structure taken as indicated by line 14—14 in FIG. 3, showing the blade in a bent or bowed condition as a result of bending loads applied thereto; and FIG. 15 is a schematic view showing an exaggerated condition of a portion of FIG. 14.

Turning to FIG. 1, a rotary-winged aircraft schematically shown and generally identified by reference character A, is provided with a thrust-producing jet-propelled rotor R rotatably mounted on the aircraft body or fuselage C in lifting relationship with respect thereto by a suitable framework F. To effect the jet-propelled thrust-producing function of rotor R, blades B constructed according to this invention, are connected to rotor hub H by suitable prior art blade-to-hub connectors not shown in detail but characterized by an appropriate transition structure T schematically illustrated in section in FIG. 2, whereby pressurized hot gas from a turbine-type gas generator G is supplied to gas-conducting passageways through the blades (hereinafter described) for ejection to atmosphere so as to produce reaction forces at the distal ends of the blades, capable of revolving the rotor at thrust-producing velocities. In regard to the above-mentioned prior art blade-to-hub connectors, reference is made to U.S. Patents Re. 23,448; 2,650,666 and 2,756,007.

As indicated in FIG. 2, transition structure T is, in effect, a stationary annular plenum chamber 20 connected at its lower end to exhaust outlet 21 of gas generator G. Mounted on top of chamber 20 for rotation with hub H about the rotor axis, is a ring-shaped member 22 having outlets 23 each provided with a fitting 24 adapted to receive in pressure-tight relationship a corresponding fitting 26 on the inlet end of a duct 25, FIGS. 2, 3 and 4. A pressure-tight relationship between chamber 20 and member 22 is effected by annular sealing elements 27—28 adapted to sealingly engage the walls of chamber 20 and member 22 and permit relative rotation therebetween without gas leakage.

It is to be noted from FIGS. 3 and 4, that blade B is a composite structure having a longitudinal or spanwise axis 30, a substantially rigid proximal or root end portion 31 extending to the left of STA. A, a flexible airfoil-shaped thrust-producing portion 32 extending to the right of STA. A and terminating in a distal or tip end portion 34, and fore and aft spars 36 and 37 interconnecting the root end and thrust-producing portions in load-carrying relationship such that centrifugal forces and lifting forces resulting from rotation of the blade in a circular path around the axis of a rotor may be transmitted to a rotor hub by any suitable structure commonly employed in the prior art for interconnecting rotor blades and rotor hubs. It is to be further noted that the composite structure of blade B is so arranged as to provide a system of gas-conducting passageways 38—38'—38'' extending spanwise of the blade from the entrance opening in duct 25 to suitable exhaust openings 39—39' in distal end portion 34 through serially connected ducts hereinafter described.

According to this invention, the airfoil-shaped thrust-producing portion 32 of blade B comprises a plurality of airfoil-shaped segments 40 (FIGS. 3, 4, 5 and 6) connected in series along the spanwise axis 30. Each of the segments 40 includes a leading edge section 41, a trailing edge section 42 and an intermediate section 44 interconnecting the leading and trailing edge sections in a chordwise direction as shown. Looking at FIGS. 5 through 9, it can be seen that intermediate section 44 is a box-like structure having upper and lower sides or skins 45—46, fore and aft end plates or webs 47—48, and a plurality of ribs 49 securely attached to the skins and end plates by any suitable means, such as spot welds. To form the gas-conducting passageways 38'—38'' through thrust-producing portion 32 of blade B, box-like intermediate section 44 of segment 40 is provided with ducts 50—51 attached to ribs 49 as by welding, such that these ducts extend spanwise through the segment and are supported in spaced relationship with respect to skins 45—46 and end plates 47—48 of the intermediate section.

The spanwise series connections of segments 40 are effected by bellows-like elements 60 (see FIGS. 7—8—11—12) having oppositely extending circumferential flanges 71—72 which are rigidly attached to the upper and lower skins 45—46 and the fore and aft end plates 47—48 of adjacent intermediate sections 44 of the segments by suitable means such as rivets 73 in FIG. 7 and rivets 74 in FIG. 8. Looking at FIGS. 7 and 8 in the regions of STA. B and STA. C it can be seen that the series connections between adjacent segments 40 effected by elements 60 are such as to provide telescoped conditions as indicated by reference numeral 52 FIG. 7, between the ends of ducts 50 in adjacent intermediate sections 44, forming passageway 38' and between the ends of ducts 51 in said adjacent sections, forming passageway 38''. In these connections, it is also noted that overlapped relationships identified by reference numerals 53—54 are provided between upper skins 45 and lower skins 46 of the adjacent intermediate sections, and that similar overlapped relationships are provided between the skins of adjacent leading edge sections 41 and adjacent trailing edge sections 42 as indicated by numerals 55—56 in FIG. 8.

An important feature of this invention resides in the fact that the connections effected between the adjacent segments 40 by bellows-like elements 60 are such that the thrust-producing portion 32 of blade B is an articulated structure wherein adjacent segments are angularly movable with respect to each other in a vertical plane extending spanwise of the blade substantially normal to and intersecting a horizontal spanwise plane extending through the chordwise center of the blade. See FIGS. 6, 9 and 12 where lines 58 and 59 respectively represent the vertical and the horizontal planes. Another feature characteristic of element 60 resides in the fact that, while adjacent segments 40 are made movable with respect to each other, as above described, relative torsional displacement between said segments about spanwise blade axis 30 is effectively precluded. These features result from the unique construction of the bellows-like element.

As shown in FIGS. 11, 12 and 13, each bellows-like element 60 is constructed as a continuous or endless band provided with sides 61—62 and ends 63—64 having in general, channel-shaped cross sections (FIGS. 11–13) characterized in that the leg portions of the channel-shaped sides and ends are turned in opposite directions parallel with a center line corresponding to spanwise axis 30 of blade B, so as to form the circumferential flanges 71—72 referred to above. Attention is directed to folds 65—66 which project outwardly from web portions 67—68 of sides 61—62 and extend lengthwise of said sides such as to terminate gradually in web-portions 67—70 of ends 63—64 as illustrated in FIG. 12. By terminating folds 65—66 a relatively short distance from the geometrical centers 75—76 of ends 63 and 64, as shown in FIGS. 11–12, element 60 is provided with flexibility limited to flexure in a single plane corresponding to the vertical plane represented by line 58, FIG. 12, which flexure is particularly adapted to produce the sought results and is of a character such that a narrowing of the width of one of the sides 61—62 causes a widening of the other side as illustrated in FIG. 15 where at STA. B and STA. C, sides 61 and 62 of elements 60 are respectively narrower and wider than normal width.

Although bellows-like element 60 is flexible as above described, it is also rigid with respect to forces circumferentially applied because of the endless-band type of construction. In other words, forces applied tangentially to circumferential flange 71 are transmitted directly to similar flange 72 (and vice versa) without relative displacement between these flanges. For this reason, element 60 provides a torsionally rigid connection between adjacent box-like sections 44 of the adjacent segments 40 comprising the thrust-producing portion 32 of blade B. Sides 61—62 of elements 60 are accurately spaced with respect to each other by suitable ties 77 having end portions preferably spot welded to the inner sides of folds 65—66 as shown in FIGS. 11–12.

Another important feature of the present invention resides in the fact that fore and aft spars 36—37 (FIGS. 3–4) which are rigidly attached to the root end portion 31 of blade B by suitable means (not shown) are also connected to the box-like intermediate sections 44 of airfoil-shaped segments 40 such that the weight of these segments and the forces produced thereby during operation on a thrust-producing rotor, are transmitted directly to the spars such that the flexible properties and the torsional rigidity of bellows-like elements 60 are effectively utilized at all times in blade B.

Looking at FIGS. 8 and 9, it can be seen that fore and aft spars 36 and 37 are respectively connected by pins or bolts 80—80' and 81—81' to fore and aft end plates 47 and 48 of box-like intermediate section 44 in the segment 40 between STA. B and STA. C. It should also be noted that bolts 80—81 and 80'—81' are respectively aligned on common axes 82—82' (FIG. 8) arranged substantially at right angles with respect to spanwise blade axis 30 in a horizontal plane represented by the line 59 passing through the neutral axes of the spars and the chordwise center line of the segment as shown in FIG. 9. This pin or bolt construction is typical for connecting any number of the segments 40 to and between fore and aft spars 36—37, as illustrated in FIG. 3 where center lines 82—82' identify the aligned axes of bolts 80—81 and bolts 80'—81' in several segments.

To point out the advantages of the pin type or bolt connections between the spars and the box-like sections 44 of segment 40 just described, attention is directed to the showing of blade B in FIG. 14 where the thrust-producing portion 32 which extends to the right from STA. A, is shown in a bent or bowed condition such as would result from flapwise bending of the blade. In FIG. 14, the trailing edge sections 42 have been omitted from the several segments comprising the thrust-producing portion to provide a clear illustration of the straight line condition of the upper and lower skins 45—46 of each box-like section 44 and the bend curvature of the fore and aft spars, of which the curvature of aft spar 37 is typical.

In constructing a blade according to this invention, it is preferable, but not essential, that bolts 80—80' and 81—81' be spaced equidistant along the neutral axis of spars 36 and 37 as illustrated in FIGS. 14—15 where two bolts 81—81' per segment 40 are shown in equally spaced relationship along dot and dash line 84 representing the neutral axis of spar 37.

It is well-known that, to avoid failure during rotor blade operation, spars 36—37 must be selected such that under maximum conditions of flapwise bending (which occurs near the root end of the blade), the resulting stresses in the spars are within the limits of elastic deflection of the material employed. Hence in spars 36—37, the radius R of the bend curvature is relatively large and is equal to $EI/M$ where E and I are the modulus of elasticity and the moment of inertia, respectively, and M is the bending moment. Thus, when bolts 80—80' and 81—81' are arranged such that the spacing is a small fraction of the length of the bend radius, the difference between the distance separating the bolt centers 86—86' along line 84 (FIG. 15) and the straight line distance $d$ separating said bolt centers is infinitesimal.

As an example, let it be assumed that the blade in FIG. 14 is to be subjected to a maximum bending moment of 89,000 inch pounds in the region of STAS. B and C as seen in FIG. 15, and that the value of EI is 41,000,000; in which case the radius R of the bend curvature under maximum flapwise bending is 461 inches. Now, assuming in this example, that the distance between bolt centers 86—86' along curved line 84 is 14.6250 inches, then by calculations employing the bend radius of 461 inches, the straight line distance $d$ is found to be 14.6244 inches. Although the difference between the spacing of the bolt centers 86—86' along curved line 84 and the straight line distance $d$ is only 0.0006 inch, the distance at the point of maximum separation of these lines, i.e., the height of the arc over the chord is 0.05799 inch which is not only large by comparison with the difference of 0.0006 inch, but because of its magnitude spars 36—37 are obliged to rotate relative to end plates 47—48 of segment 40 around bolts 80—80' and 81—81' an angular distance of 54.5 minutes.

In other words, for one direction of maximum flapwise bending, it is clearly evident that (1) spars 36—37 move around the axis of each of the bolts 80—80' and 81—81' an angular distance of nearly one degree, and while this movement is relatively small at the bolt axes, it is nevertheless, rotary or pivotal motion around the bolts; that (2) the bolt holes in the spars identified by bolt centers 86—86' move such that the straight line distance between them is less, by an amount not exceeding 0.0006 inch, than the straight line distance between corresponding holes in end plates 47—48; and that (3) this infinitesimal amount of movement is not only incapable of producing bending in segments 40, but any forces which may result from such movement are applied compressively to the end plates along straight lines extending between the bolt holes in the end plates. It should also be noted that under extreme conditions where bolts 80—80' and 81—81' are tightly fitted in the holes of the spars and end plates, localized elastic deflection of the materials surrounding the holes would easily absorb the 0.0006 inch of movement.

Thus, it becomes apparent that, because of the pivotal actions provided by the pin or bolt type connections, spars 36—37 can bend without bending any of the segments 40, that each segment assumes a straight-line attitude with respect to the curvatures of the spars, and that compensation for the angular difference between the straight-line attitudes of adjacent segments resulting from spar curvature is effected by the bellows-like element 60 interconnecting the box-like intermediate sections 44 of the adjacent segments. Note the angular compensation effected by the bellows-like elements at STA. B and STA. C in FIG. 15. In these connections, it is also noted that bending of spars 36—37 without bending segments 40 results in relative movement between the spars and end plates 47—48 of box-like sections 44; therefore, to preclude abrasion or fretting of contiguous surfaces of said spars and end plates under pressure produced by bolts 80—80' and bolts 81—81', antifretting shims 85—86 of low-friction material are installed between the said contiguous surfaces as clearly shown in FIGS. 8 and 9.

Turning again to FIGS. 3 and 4, it is noted that duct 25 in the root end portion 31 of blade B, is divided into portions 25' and 25" so as to divide passageway 38 into parts 38a and 38b, and that portions 25'—25" are respectively connected to ducts 50—51 in box-like section 44 of the first segment 40 connected to the root end blade portion 31, so that interconnections between passageways 38 and 38'—38" are provided by parts 38a and 38b of passageway 38. It is also noted that a valve 90 is provided in duct 25 at the beginning of portions 25'—25" such as to provide for selective direction of flow to gaseous fluid entering duct 25. For example, with valve 90 in the solid-line position shown, gaseous fluid entering passageway 38 flows through both passageways 38'—38" and both exhaust openings 39—39'; whereas, with valve 90 in the dotted-line position, the gaseous fluid flows through only one passageway and one exhaust opening, which in this instance are shown to be passageway 38" and exhaust opening 39'. Selective operation of valve 90 can be effected by any suitable means such as an electric or hydraulic actuator coupled to arm 92 secured to valve supporting shaft 93. The importance of this structure is a matter of economy; which is to say, that conditions may arise where, for a desired result, the amount of gaseous fluid required to effect rotor propulsion can be easily and more efficiently conducted through one passageway and one exhaust opening.

Inasmuch as spars 36—37 are, in effect, cantilever beams extending outwardly from rigid connections to root end portion 31 of blade B, it is important that the box-like intermediate section in the first of the serially connected segments 40 be connected to the root end blade portion by a bellows-like element 60 according to the showing at STA. A in FIG. 7. It is also important that a bellows-like element 60 be employed in the connection between the last of the serially connected segments 40 comprising blade B and the distal or tip end portion 34 of the blade, which tip end portion is of a construction similar to that of segments 40 previously described except for the exhaust openings 39—39'. However, it should be understood that the construction embodied in the thrust-producing portion 32 of blade B may be employed with root end portions and tip end portions constructed differently from that shown in the drawings without departing from the spirit of the invention hereinafter claimed.

What is claimed as new is:

1. A rotor blade for a jet-propelled aircraft-sustaining rotor, having a gas-conducting passageway extending spanwise through the blade, said blade comprising: a plurality of airfoil-shaped segments including gas-conducting ducts serially connected so as to constitute said passageway; and means structurally interconnecting said segments in load-carrying relationship such that the blade is provided with torsional rigidity for resisting forces acting to twist said blade about its spanwise axis and with spanwise rigidity of a character permitting flapwise bending of the blade without bending said segments, said means comprising a pair of spanwise-extending load-carrying members pivotally supporting said segments such that the axes of the pivotal supports extend chordwise of the blade along lines crossing the spanwise blade axis, said pivotal supports being such that relative movement can occur between said members and segments to the extent that bending of the load-carrying members can occur without bending the segments or their respective gas-conducting ducts.

2. A rotor blade for a jet-propelled aircraft-sustaining rotor, having a gas-conducting passageway extending spanwise through the blade, said blade comprising a plurality of airfoil-shaped segments including gas-conducting ducts serially connected so as to constitute said passageway; and means structurally interconnecting said segments in load-carrying relationship such that the blade is provided with torsional rigidity for resisting forces acting to twist said blade about its spanwise axis and with spanwise rigidity of a character permitting flapwise bending of the blade without bending said segments, said means comprising spanwise-extending load-carrying members separated by and movably connected to said segments for supporting same such that relative movement can occur between said members and segments about axes extending chordwise of the blade along lines in a normally horizontal plane intersecting the spanwise blade axis such that bending of the load-carrying members can occur without bending the segments or their respective gas-conducting ducts under conditions of flapwise bending of the blade.

3. A rotor blade for a jet-propelled aircraft-sustaining rotor, having a pressurized-gas-conducting passageway extending spanwise through the blade and terminating in a gas-expelling thrust-producing outlet at the distal end thereof, said blade comprising: a plurality of airfoil-shaped segments disposed in series along the spanwise axis of the blade, said segments including leading edge sections, trailing edge sections and intermediate sections interconnecting the leading and trailing edge sections chordwise of the blade, said intermediate sections including gas-conducting ducts arranged spanwise of the blade in gas-conducting relationship so as to constitute said passageway; and means structurally interconnecting said segments in load-carrying relationship such that the blade is provided with torsional rigidity for resisting forces acting to twist said blade about its spanwise axis and with spanwise rigidity of a character permitting flapwise bending of blade without bending said segments, said means comprising load-carrying members extending spanwise of the blade, separated by the intermediate sections of said segments and movably connected to opposite sides of each of said intermediate sections by pin-like elements for supporting the airfoil-shaped segments such that relative movement can occur between said members and intermediate sections under conditions of flapwise bending of the blade; said pin-like elements being arranged such that their axes extend chordwise of the blade along lines intersecting the spanwise blade axis at substantially right angles with respect thereto.

4. A rotor blade for a jet-propelled aircraft-sustaining rotor, having a spanwise-extending gas-conducting passageway terminating in a gas-expelling thrust-producing outlet at the distal end of the blade, said blade comprising: a plurality of airfoil-shaped segments disposed in series along the spanwise axis of the blade, said segments including leading edge sections, trailing edge sections and intermediate box-like sections interconnecting the leading and trailing edge sections chordwise of the blade, said intermediate sections including upper and lower skin-portions, and gas-conducting ducts arranged spanwise of the blade in gas-conducting relationship so as to constitute said passageway; and articulating members interconnecting said segments such as to provide said blade with torsional rigidity for resisting forces acting to twist the blade about its spanwise axis and with spanwise flexibility of a character such that flapwise bending of the blade can occur without bending said segments said articulating members comprising bellows-like elements having circumfenential flanges rigidly attached to the upper and lower skin-portions of the intermediate sections.

5. A rotor blade for a jet-propelled aircraft-sustaining rotor, having a pressurized-gas-conducting passageway extending spanwise through the blade, said blade comprising: a series of airfoil-shaped segments including leading edge sections, trailing edge sections and intermediate box-like sections interconnecting the leading and trailing edge sections, said intermediate sections including end plates respectively facing the leading and trailing edge sections, and pressurized-gas-conducting ducts connected in series so as to constitute the passageway; and means structurally interconnecting the airfoil-shaped segments in load-carrying relationship such that the blade is provided with torsional rigidity for resisting forces acting to twist said blade about its spanwise axis and with spanwise rigidity of a character such as to premit flapwise bending of the blade but precluding flapwise bending of the segments; said means comprising bellows-like elements connecting intermediate sections of adjacent segments, and spanwise-extending load-carrying members separated by and movably connected to the end plates of said intermediate sections such that relative movement can occur between said members and the end plates of said intermediate sections to the extent that flapwise bending of the load-carrying members occurs without flapwise bending of the intermediate sections under conditions of flapwise bending of the blade.

6. A rotor blade for a jet-propelled aircraft-sustaining rotor having a gas-conducting passageway extending spanwise through the blade, said blade comprising: a plurality of airfoil-shaped segments including gas-conducting ducts serially connected so as to constitute said passageway; and means structurally interconnecting said segments so as to maintain continuity of the passageway and such that said blade is provided with torsional rigidity for resisting forces acting to twist the blade about its spanwise axis and with spanwise rigidity of a character permitting flapwise bending of the blade without bending said segments, said means comprising spanwise-extending-load-carrying members having longitudinal neutral axes, and said load-carrying members being separated by and movably supporting said segments such that relative movement can occur between said members and segments about axes extending chordwise of the blade along lines intersecting the longitudinal neutral axes of the load-carrying members such that bending of the load-carrying members can occur without causing bending of the segments or their respective gas-conducting ducts.

7. A rotor blade for a jet-propelled aircraft-sustaining rotor having a gas-conducting passageway extending spanwise through the blade, said blade comprising; a series of airfoil-shaped segments including leading edge sections, trailing edge sections, and intermediate box-like sections interconnecting the leading edge and trailing edge sections chordwise of the blade, said intermediate sections including end-portions respectively facing the leading and trailing edge sections, upper and lower skin-portions, and gas-conducting ducts connected in series so as to constitute the passageway; and means structurally interconnecting said segments so as to maintain gas-conducting continuity of the passageway and such that said blade is provided with torsional rigidity for resisting forces acting to twist the blade about its spanwise axis and with spanwise rigidity of a character permitting flapwise bending of the blade without bending said segments, said means comprising bellows-like elements having circumferential flanges rigidly attached to the upper and lower skin-portions of the intermediate sections of adjacent segments, and spanwise-extending load-carrying members having longitudinal neutral axes, said load-carrying members being separated by said intermediate box-like sections and movably connected to the end-portions respectively facing the leading edge and trailing edge sections by pin-like connectors arranged such that the axes thereof extend chordwise of the blade along lines intersecting the longitudinal neutral axes of the load-carrying members and the spanwise axis of the blade and such that flapwise bending of the load-carrying members can occur without bending the box-like sections or their respective gas-conducting ducts under conditions of flapwise bending of the blade.

8. A rotor blade for a jet-propelled aircraft-sustaining rotor having a gas-conducting passageway extending spanwise through the blade, said blade comprising: a series of airfoil-shaped segments including leading edge sections, trailing edge sections, and intermediate box-like sections interconnecting the leading edge and trailing edge sections chordwise of the blade, said intermediate sections including gas-conducting ducts connected in series so as to constitute the passageway; and means structurally interconnecting said segments so as to maintain gas-conducting continuity of the passageway and such that said blade is provided with torsional rigidity for resisting forces acting to twist the blade about its spanwise axis and with spanwise rigidity of a character permitting flapwise bending of the blade without bending said segments, said means comprising bellows-like elements structurally connecting the intermediate sections of adjacent segments, and spanwise-extending load-carrying members pivotally connected to the sides of the intermediate box-like sections respectively facing the leading edge and trailing edge sections, said pivotal connections being characterized by pin-like elements disposed spanwise of the blade such that the axes of said elements on the sides facing the leading edge sections are aligned with the axes of said elements on the sides facing the trailing edge sections.

9. A rotor blade according to claim 8 wherein the aligned axes of the pin-like elements connecting the load-carrying members and the intermediate box-like sections of the segments are disposed along lines intersecting the spanwise axis of the blade substantially right angles with respect thereto.

10. A thrust-producing blade for a jet-propelled aircraft-sustaining rotor, having a thrust producing portion and a spanwise-extending gas-conducting passageway terminating in a gas-outlet at the distal end of the blade, said blade comprising: a plurality of airfoil-shaped segments forming said thrust-producing portion, said segments including box-like intermediate sections provided with upper and lower skin-portions, and with gas-conducting ducts connected in series so as to constitute the spanwise passageway; first means structurally interconnecting the box-like intermediate sections of adjacent segments such that the blade is provided with torsional rigidity for resisting forces acting to twist the blade about its spanwise axis and with spanwise flexibility of a character such that flapwise bending of the blade can occur without bending any of said segments and without affecting said torsional rigidity; said first means being characterized by bellows-like elements having circumferential flanges rigidly attached to the upper and lower skin-portions of the intermediate box-like sections; and second means joining the plurality of segments in common load-ing-carrying relationship so as to provide the blade with load-carrying ability for thrust-producing functions.

References Cited in the file of this patent

UNITED STATES PATENTS

| | | |
|---|---|---|
| 2,329,133 | Peed | Sept. 7, 1943 |
| 2,620,884 | Gluhareff | Dec. 9, 1952 |
| 2,623,599 | Kearns | Dec. 30, 1952 |
| 2,631,676 | Hiller | Mar. 17, 1953 |
| 2,645,435 | Pouit | July 14, 1953 |
| 2,872,987 | Gahagon | Feb. 10, 1959 |

FOREIGN PATENTS

| | | |
|---|---|---|
| 264,440 | Great Britain | Jan. 20, 1927 |
| 320,365 | Great Britain | Oct. 7, 1929 |
| 717,431 | Germany | June 3, 1942 |
| 670,364 | Great Britain | Apr. 16, 1952 |